| United States Patent [19] | [11] | 4,041,184 |
|---|---|---|
| Bonacina | [45] | Aug. 9, 1977 |

[54] METHOD OF CANDYING FRUIT AND FRUIT RINDS

[76] Inventor: Remigio Bonacina, Via Ai Monti 2, Mandello Lario (Como), Italy

[21] Appl. No.: 692,240

[22] Filed: June 2, 1976

[30] Foreign Application Priority Data

June 5, 1975 Italy .................................. 5166/70

[51] Int. Cl.² .............................................. A23B 7/08
[52] U.S. Cl. .................................. 426/321; 426/333; 426/639; 426/658
[58] Field of Search ............... 426/102, 103, 639, 658, 426/321, 333

[56] References Cited

U.S. PATENT DOCUMENTS

| 2,785,071 | 3/1957 | Mathews | 426/639 |
|---|---|---|---|
| 3,365,309 | 1/1968 | Pader | 426/639 |

*Primary Examiner*—Jeanette M. Hunter

[57] ABSTRACT

Method of candying fruit, in which after cooking, the fruit are immersed into a first candying syrup and remain therein until the decrease in syrup concentration has stopped. The rate of variation in syrup concentration is determined in time unit and then the syrup concentration is increased to the completion of the candying at the same rate in time unit.

4 Claims, No Drawings

METHOD OF CANDYING FRUIT AND FRUIT RINDS

This invention relates to a method of candying any kind of fruit, including chestnuts and marrons, and fruit rinds.

It is known to subject fruit and fruit rinds to candying operations, by which the negative liquid of the fruit and possible preserving liquids therein are replaced by a sugary syrup, thereby providing candied fruit which, in case of satisfactory candying operation, should maintain in unaltered state the organoliptic properties of the fruit, that is the distinctive natural flavor and aroma thereof.

Prior to subjecting the fruit to a candying process, it is known to accurately select the fruit, in order that evenly ripened and physically whole fruit are candied. The selected fruit are boiled or cooked, and then candied. To this end, the fruit are immersed into a first candying syrup comprising a sugary syrup, the concentration of which (as conventionally expressed in soluble solids and measured in Brix degrees, that is refractometric degrees measured by a refractometer) can vary between about 10° and about 30° Brix. Any skilled candier will know by trial or experience at which syrup concentration the candying operation for the various types of fruit should begin. When it is not known which should be the starting syrup concentration, a candying process would be initiated with a syrup having a concentration of about 10° Brix.

At the surface of syrup-immersed fruit, an osmotic pressure is built up with a resulting asmotic diffusion of the sugary solution and negative liquid in the boiled fruit through the surface of the fruit, while the concentration of said first candying syrup continuously decreases. Such a diffusion will stop when the osmotic pressure is zeroed or released, while the syrup concentration reaches and is settled at a lower value than at the beginning of the candying operation.

The candying operation can not be initiated with unduly concentrated syrups because, as a result of the extremely high osmotic pressure being built up, the fruit would break easily to pieces and become irretrievably damaged.

Since candied fruit should contain soluble solids in very high concentration, according to the prior art, after allowing the fruit to remain immersed in the first candying syrup for a time which is not defined, but is selected the basis of each candier's individual experience, the candying syrup concentration is slowly and empirically increased to about 60°-75° Brix.

Since no well defined rule was heretofore known as to the candying operation process, the results obtained were quite unpredictable and variable. In other words, it is sometimes possible by the prior art to provide very well candied fruit, but having more often a poor candying, and still more often a very bad candying and damage of the fruit.

It is the primary object of the present invention to provide a method of candying fruit and fruit rinds, which is fully reproducible, easily carried out and leading to the production of fruit exhibiting very good physical and candying characteristics.

These and still other objects are achieved by a method, according to which, after being subjected to a preliminary selection and cooking treatment in accordance with conventional techniques, the fruit are immersed into a first candying syrup having a concentration of soluble solids commensurable between about 10° and about 60° Brix at a temperature of about 50°-60° C, the syrup concentration being then increased to a value of about 60°-75° Brix, the method being characterized in that the fruit are allowed to remain in said first candying syrup until the syrup concentration is stabilized at a constant value, the difference $\Delta C$ in Brix degrees between the initial concentration and the constant final concentration of the first syrup and time $\Delta t$, as required for said first syrup to pass from the initial concentration to the constant final concentration, are measured, a numerical constant $\Delta C/\Delta t$ is calculated as obtained by dividing said difference $\Delta C$ by said time interval $\Delta t$, then the concentration is gradually increased for the syrup having the fruit immersed therein, taking care that such an increase in concentration in time unit is of a value equal to the numerical constant $\Delta C/\Delta t$, the increase in syrup concentration being continued until a value of about 65° Brix and 75° Brix is achieved.

As a matter of fact, by the method according to the present invention, when treating the fruit with the first candying syrup, the ideal osmotic pressure for the involved fruit is provided, and then such an ideal osmotic pressure is maintained substantially constant to candying completion, in case adding still further concentrated syrups to that in which the fruit are already immersed and replacing said syrups with other increasingly more concentrated syrups.

Preferably, the candying syrups are at a temperature of about 55° C and are maintained under slight stirring by means of a screw or propeller which is driven in either direction at successive intervals.

The determination or establishment of the movement at which the concentration of said first candying syrup is stabilized at a constant value is effected, for example, by a refractometer giving in Brix degrees the concentration expressed as soluble solids. As the syrup concentration varies, also the reading provided by the refractometer will vary. When no variation is indicated by the refractometer reading, this will mean that concentration has been stabilized at a constant value, so that the syrup concentration variation in Brix degrees from the initial to the constant final value, as well as the time involved or required for such a variation, can be measured.

The numerical constant $\Delta C/\Delta t$ represents the numerical value of how many Brix degrees the syrup concentration has varied in time unit, while the fruit were subjected to the ideal osmotic pressure, or the pressure occurring in the process with said first candying syrup, the concentration of which is well known to any skilled candier.

In order that the characteristics of the method according to the present invention be more clearly understood, two exemplary embodiments of the method will now be briefly described.

EXAMPLE 1

For a cherry candying operation, the cherries are boiled according to conventional techniques, whereupon the boiled cherries are immersed into a candying syrup at a temperature of 55° C and a concentration of 12° Brix, such a concentration being controlled by a refractometer. As shown by the refractometer reading, no variation in concentration is shown after 6 hours, while the first candying syrup has a constant final concentration of 8° Brix.

Now, the numerical constant of the process can be calculated as $(12-8)/6 = 0.66$, this value indicating the Brix degree variation for the concentration of said first candying syrup in time unit. The syrup concentration is now increased by 0.66° Brix/h to a final concentration of 70° Brix.

The increase in syrup concentration can be provided replacing each time the pre-existent syrup with a syrup in which the concentration is higher by 0.66° Brix than the former, or adding a more concentrated syrup to the pre-existent syrup, so that the concentration of the mixture of said two syrups is 0.66° higher than that of the pre-existent syrup.

At the end of the candying operation, very good candied cherries are obtained, the cherries having unaltered physical and organoleptic characteristics over those of the starting fruit.

EXAMPLE 2

Boiled marrons (chestnuts) are immersed into a first candying syrup having a concentration of 50° Brix. It will be seen that after 5 hours the concentration is stabilized at a constant value of 40° Brix. In this case, the numerical constant of the process is 10/5 = 2, and therefore the candying operation can be carried out by increasing the syrup concentration by 2° Brix/h to a final syrup having a concentration of 72° Brix.

Also in this case, candied marrons (marrons glaces) are provided having both very good physical and organoleptic characteristics.

What I claim is:

1. A method for candying fruit or fruit rinds comprising the steps of
selecting said fruit or fruit rinds and subjecting them to a preliminary cooking;
immersing the cooked fruit or fruit rinds into a candying syrup having a starting concentration in soluble solids in the range of about 10° to 60° Brix at a temperature of about 50°–60° C;
controlling the value of the concentration of the syrup until it is decreased to a constant value and measuring said constant value together with the time elapsed DT;
calculating the difference DC between the value of the starting concentration and the constant value of said concentration of the syrup;
calculating the mean absorption rate of the treated fruit or fruit rinds as a ratio DC/DT of the difference between the starting and the constant value of the concentration of the syrup and the time interval DT;
increasing the concentration of the syrup at the same rate DC/DT until it reaches a final concentration in the range of about 65° to 75° Brix.

2. A method according to claim 1, wherein the variation in candying syrup concentration is effected by intermittently using syrups of increasingly higher concentration than the pre-existent syrup.

3. A method according to claim 1, wherein said candying syrup is mechanically stirred.

4. A method according to claim 1, wherein the concentration of said first candying syrup is the range of 10° and 30° Brix.

* * * * *